Patented Feb. 4, 1941

2,230,582

UNITED STATES PATENT OFFICE 2,230,582

METHOD FOR THE PREPARATION OF HIGH GRADE FATTY ACIDS

Hans Beller, Baton Rouge, La., assignor, by mesne assignments, to Jasco Incorporated, a corporation of Louisiana No Drawing. Application July 22, 1936, Serial No. 91,911

8 Claims. (Cl. 260—451)

This invention relates to the manufacture of high-grade fatty acids by oxidation of normally solid or liquid non-aromatic hydrocarbons.

When subjected to the well-known oxidation process at elevated temperature and in the liquid phase, these hydrocarbons yield normal fatty acids as well as substantial quantities of superoxidized acidic compounds which latter are chiefly responsible for the dark color and the disagreeable odor of the synthetic fatty acids. Attempts to avoid or to remove these undesirable by-products, either by modification of the oxidation method or by treatment of the finished product with bleaching agents, have met with little success.

I have now discovered that particularly highgrade, higher molecular fatty acids are obtainable by oxidizing the normally solid or liquid non-aromatic hydrocarbons at low temperatures of from about 90 to about 140° C., preferably at from 110 to 120° C., and in the presence or absence of oxidation catalysts, such as manganese-stearate, or other manganese compounds, cobalt naphthenate, or similar metal compounds. Thereafter the crude fatty acids which are separated from the oxidation product in any well known manner are subjected to a treatment with concentrated sulfuric acid.

The result is a mixture of fatty acids which are only lightly colored and possess an agreeable odor. Without further purification, such as distillation, those acids are available for industrial purposes, for instance, in the manufacture of soap, or as softener in the rubber industry.

The oxidation may be accomplished in the liquid phase, and the oxidizing agent may be air, or any other oxidizing gas or mixture of gases. It is important to observe a low reaction temperature of from about 100 to 130° C., preferably of 115° C., as this expedient has been found to repress the noxious and undesirable occurrence of superoxidized fatty acids, such as, for instance, hydroxy fatty acids and keto- and aldehyde fatty acids in the crude product, and furthermore to lead to crude fatty acids which are accessible to further purification treatment with concentrated sulfuric acid.

The undesirable superoxidized products can furthermore be avoided by a stepwise oxidation of the initial hydrocarbons, instead of complete oxidation into acid or neutral oxidation products in one operation. Thus the oxidation may be discontinued as soon as, for instance, 30 to 60% of the initial hydrocarbons are transformed into acids. The non-oxidized hydrocarbons freed from those acids, as well as any neutral oxidation products, such as aldehydes, ketones, alcohols, etc., may be re-submitted to the oxidation treatment, under the same conditions, until all the initial material is converted into fatty acids. In the stepwise operation, the maintenance of the aforementioned low temperatures is again essential.

I might mention that oxidation at higher temperatures of from about 140° to 160° C. yields crude fatty acids which do not respond to purification treatment with sulfuric acid. Accordingly those temperatures are not intended for my present invention. But in order to facilitate the oxidation of the hydrocarbons at low temperatures, an initial temperature of from 140° C. to 150° C. may be employed for a short time, whereupon the balance of the reaction is brought to a finish at the preferred lower temperature.

The separation of the crude fatty acids from the oxidation products may be secured in any known manner. For example by extraction with solvents or by distillation of the unsaponifiable matter from the saponified oxidation product. The products may be saponified with aqueous solutions of caustic alkalis or alkali carbonates at elevated temperature and under pressure. Saponification can also be accomplished in an anhydrous medium, if desired in organic solvents. The application of saponification temperatures of about 300° C. and above is particularly advantageous, and catalysts and/or hydrogen or other inert gases may be employed.

The subsequent treatment of the crude fatty acids with sulfuric acid occurs at ordinary or elevated temperature. The concentration of the acid should primarily be of from 93 to 98%, but it may be lower, as from 50 to 80%. The quantity of the acid can be varied within wide limits, and depends chiefly upon several factors, such as concentration of acid, or its $SO_3$ content; the quality of the crude fatty acids, and the desired degree of purification. In actual plant work, amounts of from 1 to 20% by weight, calculated upon the amount of crude fatty acids, have been found satisfactory. The sulfuric acid is slowly mixed with the crude fatty acids, accompanied by strong agitation. The crude acids may advantageously be dissolved in a solvent for this treatment, but such solvents must be stable against the action of concentrated sulfuric acid, such as, for instance, saturated hydrocarbons having a boiling point of from about 30 to about 150° C. The concentrated sulfuric acid may be replaced by its derivatives, such as chlorosulfonic acid, or sulfur trioxide alone or dissolved, for instance, in concentrated sulfuric acid. A step-wise treatment of the crude acids with sulfuric acids or its derivatives may be preferred; thus the purification with 10 parts by weight of sulfuric acid may be divided into two or three steps.

In some cases, the effect of the acid treatment may be improved by an additional treatment of the crude or distilled fatty acids with about 2 to 10% of phosphoric acid; this treatment may take place before simultaneously or after the sulfuric acid purification. The same conditions are employed as in the sulfuric acid treatment.

The concentrated sulfuric acid removes the superoxidized products, such as hydroxy fatty acids, odor substances and coloring compounds and bodies, from the crude fatty acids. The products are separated as a heavy bottom layer from the reaction mixture in the form of polymerization or resinification products, or as sulfonation products, together with the added sulfuric acid.

When the acid sludge is removed, it is possible to free the crude acids from the last traces of resinified and polymerized, darkly colored reaction products by treatment with surface active bodies, such as clay, bleaching earth, adsorption carbon, etc.

A particularly far-reaching purification, accompanied by a saving in amount of sulfuric acid, may be realized by liberating the crude fatty acids from hydroxy fatty acids through treatment with solvents, prior to the acid treatment. Petrol ether is a very satisfactory solvent. Furthermore, a very valuable modification of the acid purification has been found by extending the treatment to distilled fatty acids obtained from the crude fatty acids. One of the examples given below illustrates this discovery.

It appears that the concentrated sulfuric acid, when applied to the crude fatty acids, does not restrict its action to polymerization, oxidation or sulfonation. It also probably dissolves several elements of the crude synthetic acids. Thus after separation of the sulfuric acid layer from the treated fatty acids, it is possible to readily recover the organic compounds contained in the mineral acid by dissolution with water. Upon decomposing the acid sludge with water, organic compounds separate as an insoluble oily layer on the surface of the diluted acid which may be worked up in any known manner, for instance, into cheap emulsifiers. The diluted acid can be concentrated and returned to the purification plant.

At any rate, I have discovered that the concentrated sulfuric acid treatment eliminates completely or partially the hydroxyacids, lactones and other superoxidized compounds from the crude fatty acids. It stabilizes the acids towards the action of heat or oxygen. It improves the odor and color of the acids as well as of the soaps made therefrom. It removes partially or completely all unsaponifiable components, such as aldehydes, ketones, or alcohols, which impart to the crude acids their specific smell. It also renders the acids more susceptible to distillation. For instance, by subsequent fractionated distillation in vacuo any fractions may be separated of which, for example, the one going over up to 150° C. under 10 mm. mercury pressure is preferred for the manufacture of metal salts, while the fatty acids boiling at from 150 to 260° C., or up to 280° C., are eminently suitable for the preparation of white soaps.

I may finally mention that suitable initial materials for my invention are solid or liquid non-aromatic hydrocarbons in pure form or as natural or industrial mixtures, for instance, mineral oil or its fractions, cracking products from mineral oil, crude scale wax, slop wax, sweater oil, petrolatum, fuel and Diesel oils, products of the mineral oil, coal, or tar hydrogenation, also synthetic hydrocarbons, crude or in purified form.

The following examples illustrate the invention: The parts are by weight.

Example 1

Crude scale wax, after addition of 0.20% of manganese naphthenate and 0.20% soda, is oxidized in the liquid phase by blowing air through it; the amount of air applied for this reaction is 0.3 cbm. per kg. of crude scale wax per hour. At the beginning, the temperature of reaction is kept at 140° C., but is lowered to 115° C. after one hour. Nine hours later, an oxidation product is obtained containing 40% of acidic components. This is then saponified with the necessary amount of caustic alkali, determined by the saponification number of the product; the reaction is carried out in 20% aqueous solution in a pressure vessel for two hours at 305° C., with agitation. Ethyl alcohol is added to the cold saponification mixture to avoid emulsions, and repeated extraction with gasoline is carried out to remove unsaponifiable constituents. The crude fatty acids are liberated subsequent to the removal of the solvent by addition of sulfuric acid of 20% strength to the warm soap solution.

One hundred parts by weight of the crude fatty acids so obtained are then dissolved in 2,000 parts by weight of low-boiling petrolether (60 to 90° C.), and are slowly mixed at room temperature with 10 parts by weight of sulfuric acid of 98% strength, with agitation. The solution is left alone, when the stirring has been continued for about 10 minutes, whereupon a heavy, dark-colored bottom layer separates, which contains the sulfuric acid and polymerization, resinification, and sulfonation products. After removal of this bottom layer, the purified fatty acid solution is treated with 2% of clay, in order to withdraw the last remainders of the reaction products. The last traces of sulfuric acid are washed out with hot water or sodium chloride solution. Crude fatty acids are thus obtained, which are very considerably improved over untreated crude fatty acids and represent a product ready for sale.

The following table indicates numerically the effects accomplished in the aforegoing example:

| | Acid number | Saponification number | Percent unsaponified substances | Percent hydroxy acids | Lovibond color 6" cell |
|---|---|---|---|---|---|
| Crude fatty acids, untreated. | 215 | 233 | 1.5 | 0.7 | 282 red; 342 yellow. |
| Crude fatty acids, treated with 10% concentrated sulfuric acid and clay. | 214 | 232 | 0.7 | 0.1 | 66 red; 234 yellow. |

If the treated as well as the untreated fatty acids are subjected to a vacuum distillation with application of steam, a fraction going over at from 150 to 280° C. at 10 mm. pressure (measured in oil, bottoms-temperature) displays the following characteristics:

| | Acid number | Saponification number | Ester number | Lovibond color 6" cell |
|---|---|---|---|---|
| Distilled fatty acids from untreated crude acids. | 221 | 234 | 13 | 9 red; 48 yellow. |
| Distilled fatty acids from acid-treated crude acid. | 219 | 228 | 9 | 2 red; 15 yellow. |

Fatty acids from oxidation products obtained at temperatures above 140° C. are showing very little improvement upon treatment with sulfuric acid. Improvement of odor and color are unsatisfactory, even upon application of large amounts of concentrated sulfuric acid. The Lovibond-color of such crude fatty acids, which, for instance, prior to treatment was 700 Red and 1,200 Yellow in the 6" cell, will, after treatment with 20% of concentrated sufuric acid, still be above 500 Red and above 800 Yellow. The odor of those acids undergoes a hardly noticeable improvement by treatment with sulfuric acid.

*Example 2*

A mixture of 50 parts of crude scale wax, having a melting point of 50° C., and of 50 parts of unsaponifiable constituents recovered from an oxidation product of crude scale wax by saponification and extraction, is oxidized in the manner of Example 1 pursuant to addition of 0.3% manganese stearate and 0.15% potassium carbonate until an acid number of 55 is reached in the oxidation product. Subsequently the oxidation product is saponified in a pressure vessel, with agitation, for two hours at 200° C. in a 20% aqueous solution containing the theoretically required amount of sodium carbonate, calculated upon the saponification number of the oxidation product. The cold saponification mixture is mixed with isopropyl alcohol, and is extracted with low-boiling gasolene for the purpose of removing the unsaponifiable parts. The crude fatty acids are liberated from the soap solution, after separation of the solvent, by addition of sulfuric acid of about 50% strength, and they are freed from mineral acids by washing with water.

The crude fatty acids are thereafter subjected to a vacuum distillation under about 10 mm. mercury pressure. About 0.3 part of steam per 1 part of crude fatty acid are blown into the fatty acids during the distillation, which is continued up to a bottoms temperature of 280° C.

Ten parts of the distilled fatty acids, from which during distillation the low-boiling constituents containing less than 10 carbon atoms have been fractionated, are now dissolved in 100 parts of petrol ether, and are treated with 0.5 part of sulfuric acid of 96% strength for about 3 minutes, at 30 to 40° C. Pursuant to settling and separation of the darkly colored sulfuric acid layer, the last traces of the acid sludge are removed by treatment with about 3% of clay, whereupon the solution of the purified fatty acids is washed with water to remove traces of mineral acid. The gasolene which was applied as a solvent is distilled by means of steam.

The following table illustrates the effect accomplished by the sulfuric acid treatment:

| | Lovibond-color 6" cell | | Odor of the fatty acids | Properties of the soap obtained from the acids |
|---|---|---|---|---|
| | Red | Yellow | | |
| Before the acid treatment. | 8 | 40 | Rancid, sticky.. | Color yellowish; odor disagreeable, rancid. |
| After the acid treatment. | 2.5 | 20 | Agreeable; fatty acid odor. | Color white, practically without odor. |

An unsatisfactory, negligible improvement is obtained if the distilled fatty acids resulting from the oxidation products obtained at high temperatures of from 140 to 160° C., are subjected to the above-described treatment. The color of the soaps manufactured from those fatty acids is yellow, their odor is disagreeable and rancid.

*Example 3*

Crude fatty acids are obtained, in accordance with Example 2, by oxidation of a mixture of crude scale wax and of unsaponifiable constituents from an oxidation product of crude scale wax, and by saponification with aqueous caustic alkali solution at 170° C. Ten parts thereof are dissolved in 100 parts of petrolether, and are washed at 50° C. with 0.5 part of sirupy phosphoric acid. Following the separation of the phosphoric acid layer, the solution of the fatty acids is treated with 1 part of sulfuric acid of 80% strength, and after settling and separation of the sulfuric acid layer is further treated with 0.5 part of clay. The clay is filtered off, and the fatty acids are washed with water to effect removal of traces of mineral acid, and the solvent is eliminated by distillation with introduction of steam.

The result is very lightly colored fatty acids possessing an agreeable odor, which in the crude or distilled state may be manufactured into lightly colored soaps. The soap thus obtained is practically without odor.

*Example 4*

One hundred parts of crude fatty acids, which were obtained from an oxidation product of crude scale wax, in accordance with Example 1, are treated with 10 parts sulfuric acid of 96% strength at about 40° C., with a solvent. The mixing of the fatty acids with sulfuric acid occurs by blowing in air. Following the settling and removal of the acid layer, the fatty acids are treated for a brief period with steam vapor at temperatures above 90° C., for the purpose of precipitating residual acid sludge, and for removal of traces of dissolved sulfur dioxide. The fatty acids thus treated, if desired, may be liberated from remainders of acid sludge by filtration, centrifuging, or treatment with clay.

Upon fractionated distillation in vacuo, the acid-treated fatty acid yields an almost white soap stock, which has no objectionable odor and which, upon saponification, gives white soaps free from odor.

The treatment of the crude or distilled fatty acids can be continuously accomplished in any known or customary manner, whereby, for instance, the fatty acids and the sulfuric acid are brought into contact with each other in continuous mixing devices, and the separation of the acid layer is effected in continuously working settling vessels. The removal of the acid sludge may occur in continuously working centrifuges or filter presses.

What I claim is:

1. A method of manufacturing fatty acid mixtures which are colorless and possess the natural odor of fatty acids which comprises oxidizing in the liquid state with oxygen-containing gases at temperatures of from 90 to about 125° C. hydrocarbons selected from the group consisting of liquid and solid non-aromatic hydrocarbons, saponifying the crude oxidation product, separating the unsaponifiable material therefrom, decomposing the saponification product and purifying the resulting fatty acid mixture dissolved in an inert solvent by treatment with a small amount of concentrated sulfuric acid.

2. A method of manufacturing fatty acid mixtures which are colorless and possess the natural odor of fatty acids which comprises oxidizing in the liquid state with oxygen-containing gases at temperatures of from 90 to about 125° C. hydrocarbons selected from the group consisting of liquid and solid non-aromatic hydrocarbons, saponifying the crude oxidation product, separating the unsaponifiable material therefrom, decomposing the saponification product and purifying the resulting fatty acid mixture dissolved in an inert solvent by treatment with a small amount of concentrated sulfuric acid of from 93–98% strength.

3. A method of manufacturing fatty acid mixtures which are colorless and possess the natural odor of fatty acids which comprises oxidizing in the liquid state with oxygen-containing gases at temperatures of from 90 to about 125° C. hydrocarbons selected from the group consisting of liquid and solid non-aromatic hydrocarbons, saponifying the crude oxidation product, separating the unsaponifiable material therefrom, decomposing the saponification product and purifying the resulting fatty acid mixture dissolved in an inert solvent by treatment with a small amount of concentrated sulfuric acid of from 50–80% strength.

4. A method of manufacturing fatty acid mixtures which are colorless and possess the natural odor of fatty acids which comprises oxidizing in the liquid state with oxygen-containing gases at temperatures of from 90 to about 125° C., hydrocarbons selected from the group consisting of liquid and solid non-aromatic hydrocarbons, saponifying the crude oxidation product, separating the unsaponifiable material therefrom, decomposing the saponification product, liberating the crude fatty acids thus obtained from hydroxy fatty acids by extraction with a low boiling aliphatic organic solvent, and purifying the extracted mixture dissolved in an inert solvent by treatment with a small amount of concentrated sulfuric acid.

5. A method of manufacturing fatty acid mixtures which are colorless and possess the natural odor of fatty acids which comprises oxidizing in the liquid state with oxygen-containing gases at temperatures of from 90 to about 125° C. hydrocarbons selected from the group consisting of liquid and solid non-aromatic hydrocarbons, saponifying the crude oxidation product, separating the unsaponifiable material therefrom, decomposing the saponification product, liberating the crude fatty acids thus obtained from hydroxy fatty acids by extraction with petroleum ether, and purifying the extracted fatty acid mixture dissolved in an inert solvent by treatment with a small amount of concentrated sulfuric acid.

6. A method of manufacturing fatty acid mixtures which are colorless and possess the natural odor of fatty acids which comprises oxidizing in the liquid state with oxygen-containing gases at temperatures of from 90 to about 125° C. hydrocarbons selected from the group consisting of liquid and solid non-aromatic hydrocarbons, saponifying the crude oxidation product, separating the unsaponifiable material therefrom, decomposing the saponification product, distilling the crude fatty acids thus obtained, and purifying the resulting distillate dissolved in an inert solvent by treatment with a small amount of concentrated sulfuric acid.

7. A method of making fatty acid mixtures which are colorless and possess the natural odor of fatty acids which comprises oxidizing crude scale wax at 115° C., until an oxidation product is obtained containing 40% of acidic components, saponifying the crude oxidation product with caustic alkali, separating the unsaponifiable material therefrom by extraction with gasoline, decomposing the saponification product by treatment with sulfuric acid of 20% strength, extracting the crude fatty acid thus obtained with petroleum ether to remove the hydroxy fatty acids, and purifying the resulting mixture dissolved in an inert solvent by treatment with a small amount of concentrated sulfuric acid of 98% strength.

8. A method of making fatty acid mixtures which are colorless and possess the natural odor of fatty acids which comprises oxidizing a mixture of crude scale wax and of unsaponifiable constituents recovered from an oxidation product of crude scale wax by saponification and extraction, at 115° C., until an acid number of 55 is reached in the oxidation product, saponifying the crude oxidation product, separating the unsaponifiable material therefrom with gasoline, decomposing the saponification product, and subjecting the resulting crude fatty acids to a vacuum distillation, under a pressure of about 10 mm. mercury, until a temperature of 280° C. is reached, and purifying the resulting distillate dissolved in an inert solvent by treatment with a small amount of concentrated sulfuric acid of 96% strength.

HANS BELLER.